United States Patent
Gahlot et al.

(10) Patent No.: US 11,068,653 B2
(45) Date of Patent: Jul. 20, 2021

(54) SYSTEM AND METHOD FOR CONTEXT-BASED ABBREVIATION DISAMBIGUATION USING MACHINE LEARNING ON SYNONYMS OF ABBREVIATION EXPANSIONS

(71) Applicant: Innoplexus AG, Eschborn (DE)

(72) Inventors: Tanay Gahlot, Goa (IN); Tapashi Mandal, Baruipur (IN); Vatsal Agarwal, Rampur (IN)

(73) Assignee: Innoplexus AG, Eschborn (DE)

(*) Notice: Subject to any disclaimer, the term of this patent is extended or adjusted under 35 U.S.C. 154(b) by 169 days.

(21) Appl. No.: 16/145,935

(22) Filed: Sep. 28, 2018

(65) Prior Publication Data
US 2020/0104360 A1    Apr. 2, 2020

(51) Int. Cl.
| | |
|---|---|
| G06F 40/242 | (2020.01) |
| G06F 17/16 | (2006.01) |
| G06F 40/284 | (2020.01) |
| G06F 16/248 | (2019.01) |
| G06F 40/166 | (2020.01) |
| G06N 3/04 | (2006.01) |
| G06N 3/08 | (2006.01) |
| G06N 20/00 | (2019.01) |
| G06F 16/36 | (2019.01) |
| G06F 16/332 | (2019.01) |

(Continued)

(52) U.S. Cl.
CPC ........ *G06F 40/284* (2020.01); *G06F 16/3329* (2019.01); *G06F 16/367* (2019.01); *G06F 16/374* (2019.01); *G06F 40/242* (2020.01); *G06F 40/247* (2020.01); *G06F 40/30* (2020.01); *G06N 3/0454* (2013.01); *G06N 3/08* (2013.01); *G06N 20/00* (2019.01)

(58) Field of Classification Search
CPC ...... G06F 40/242; G06F 17/16; G06F 40/284; G06F 16/248; G06F 40/166
USPC .......................................................... 704/9
See application file for complete search history.

(56) References Cited

U.S. PATENT DOCUMENTS

| | | | |
|---|---|---|---|
| 8,316,007 B2* | 11/2012 | Liao | G06F 16/3322 707/709 |
| 9,779,147 B1* | 10/2017 | Sherman | G06F 16/248 |

(Continued)

*Primary Examiner* — Farzad Kazeminezhad
(74) *Attorney, Agent, or Firm* — Ziegler IP Law Group, LLC (57) ABSTRACT

Disclosed is a system for context-based abbreviation disambiguation, the system comprising: an ontological databank represented into a multi-dimensional space, a synonym databank, a glossary databank, and a server arrangement. The server arrangement is configured to obtain a text comprising abbreviations and concept phrases, extract a target abbreviation from the abbreviations, obtain potential expansions for the target abbreviation, calculate a synonym match score for potential expansions, using synonyms of the potential expansions and the concept phrases, calculate a concept match score, using concepts relating to the potential expansions and the concept phrases, calculate a context match score for the potential expansions using a comparison module, and determine one of the potential expansions as a valid expansion of the target abbreviation based on at least one of the: synonym match score, concept match score and context match score.

10 Claims, 3 Drawing Sheets

(51) Int. Cl.
_G06F 40/30_ (2020.01)
_G06F 40/247_ (2020.01)

(56) References Cited

U.S. PATENT DOCUMENTS

| | | | | |
|---|---|---|---|---|
| 2012/0084076 | A1* | 4/2012 | Boguraev | G06F 40/242 704/9 |
| 2017/0213222 | A1* | 7/2017 | Rajpathak | G06F 17/16 |
| 2018/0107702 | A1* | 4/2018 | Havlicek | G06F 40/166 |
| 2018/0349350 | A1* | 12/2018 | Zhu | G06F 40/284 |

* cited by examiner

SYSTEM AND METHOD FOR CONTEXT-BASED ABBREVIATION DISAMBIGUATION USING MACHINE LEARNING ON SYNONYMS OF ABBREVIATION EXPANSIONS

TECHNICAL FIELD

The present disclosure relates generally to systems for abbreviation disambiguation, and more specifically, to systems for context-based abbreviation disambiguation. Moreover, the present disclosure relates to methods of context-based abbreviation disambiguation.

BACKGROUND

Presently, abbreviations are used extensively in a variety of documents to abbreviate words or phrases so as to save time, effort or space. Typically, an abbreviation refers to a shortened form of a phrase that is derived from letters of the phrase. Furthermore, the abbreviation may be an acronym. Specifically, the acronym is an abbreviation formed from initial letters of words constituting acronym phrase. Typically, the acronyms are pronounced as a word. In an example, 'UN' is an abbreviation for 'United Nations'. In another example, 'NASA' is an abbreviation for 'The National Aeronautics and Space Administration'. In yet another example, 'Dr.' is an abbreviation for 'Doctor'. Typically, some abbreviations are used in common language while other abbreviations are more specific to a certain domain or discipline.

However, an abbreviation may have a plurality of expansions associated therewith. It will be appreciated that an abbreviation may have different expansions with respect to use and/or domain thereof. In an example, an abbreviation 'PTO' may refer to 'Paid Time Off' or 'Personal Time Off' in Human Resources domain, 'Patent and Trademark Office' in patent and law domain, 'Parent and Teacher Organization' in education domain, 'Please Turn Over' with reference to documentation, and 'Power take-off' in automotive engineering domain. Specifically, the abbreviation may be defined diversely across different domain of use. Subsequently, determining the expansion of the abbreviation employs the knowledge of the domain it is used in, thereby making the process of determining expansion of the abbreviation cumbersome and time-consuming Furthermore, an abbreviation may have multiple expansions within a domain and between domains. Specifically, the abbreviation may have a plurality of expansions in the same domain. In an example, an abbreviation 'ODCS' may relate to a type of cell namely, 'Oligodendrocytes', a compound 'Octyldimethylchlorosilane', or a compound 'Octadecyldimethylchlorosilane' among other possible expansions in the field of biomedical. Consequently, it becomes difficult even for a reader skilled in the domain to determine correct expansion of the abbreviation.

Conventionally, web-based abbreviation dictionaries provide a reader with a plurality of potential expansions for an abbreviation. However, the plurality of potential expansions creates ambiguity for the reader with respect to correct expansion for the abbreviation. Therefore, to determine the correct expansion for the abbreviation, the reader has to develop knowledge pertaining to the domain of use. Moreover, in an example, the reader has to analyze the document containing the abbreviation so as to determine the correct expansion of the abbreviation. Additionally, ascertaining a word from a document as abbreviation to be expanded or a legitimate word having same characters as an abbreviation muddles the process of determining the correct expansion for the abbreviation.

Notably, humans may disambiguate the plurality of potential expansions manually using web-based abbreviation dictionaries, so as to determine the correct expansion of the abbreviation. However, there exists no means for automated computer systems to determine the correct expansion of the abbreviation from amongst the plurality of potential expansions. Consequently, analyzing the document comprising the abbreviation on machine level becomes ambiguous and often leads to incorrect interpretation.

Therefore, in the light of the foregoing discussion, there is a need to overcome the aforementioned drawbacks associated with conventional systems for abbreviation expansion for extracting correct expansion.

SUMMARY

The present disclosure seeks to provide a system for context-based abbreviation disambiguation. The present disclosure also seeks to provide a method of context-based abbreviation disambiguation. The present disclosure seeks to provide a solution to the existing problem of indeterminate ways for expansion of abbreviation for disambiguation thereof. An aim of the present disclosure is to provide a solution that overcomes at least partially the problems encountered in prior art and provides a platform for executing context-based disambiguation of abbreviation, thereby enhancing runtime and computational efficiency.

In one aspect, an embodiment of the present disclosure provides a system for context-based abbreviation disambiguation, the system comprising:

an ontological databank represented into a multi-dimensional space;

a synonym databank;

a glossary databank; and a server arrangement communicably coupled to the ontological databank, the synonym databank and the glossary databank, wherein the server arrangement is configured to:

obtain a text comprising at least one abbreviation and a plurality of concept phrases;

extract a target abbreviation from the at least one abbreviation in the text;

obtain, using the glossary databank, a plurality of potential expansions for the target abbreviation;

determine coordinates of each of the plurality of potential expansions and each of the plurality of concept phrases, in the multi-dimensional space using the ontological databank;

calculate a synonym match score for each of plurality of potential expansions, using synonyms of each of the plurality of potential expansions and the plurality of concept phrases, wherein the synonyms of each of the plurality of potential expansions are extracted from the synonym databank;

calculate a concept match score, using concepts relating to each of the plurality of potential expansions and the plurality of concept phrases, wherein concepts relating to each of the plurality of potential expansions are determined using the ontological databank;

calculate a context match score for each of the plurality of potential expansions using a comparison module, wherein a contextual embedding of each of the plurality of potential expansions in the ontological databank is compared with a contextual embedding of the target abbreviation in the text; and determine one of the plurality of potential expansions as a valid expansion of the target abbreviation based on at least one of the: synonym match score, concept match score and context match score.

In another aspect, an embodiment of the present disclosure provides a method of context-based abbreviation disambiguation, wherein the method is implemented via a system comprising a server arrangement communicably coupled to an ontological databank, a synonym databank, and a glossary databank, the method comprising the method comprising:

obtaining a text comprising at least one abbreviation and a plurality of concept phrases;

extracting a target abbreviation from the at least one abbreviation in the text;

obtaining, using the glossary databank, a plurality of potential expansions for the target abbreviation;

determining coordinates of each of the plurality of potential expansions and each of the plurality of concept phrases, in the multi-dimensional space using the ontological databank;

calculating a synonym match score for each of the plurality of potential expansions, using synonyms of each of the plurality of potential expansions and the plurality of concept phrases, wherein the synonyms of each of the plurality of potential expansions are extracted from the synonym databank;

calculating a concept match score, using concepts relating to each of the plurality of potential expansions and the plurality of concept phrases, wherein concepts relating to each of the plurality of potential expansions are determined using the ontological databank;

calculating a context match score for each of the plurality of potential expansions using a comparison module, wherein a contextual embedding of each of the plurality of expansions in the ontological databank is compared with a contextual embedding of the target abbreviation in the text; and determining one of the plurality of potential expansions as a valid expansion of the target abbreviation based on at least one of the: synonym match score, concept match score and context match score.

Embodiments of the present disclosure substantially eliminate or at least partially address the aforementioned problems in the prior art and enables expansion of the target abbreviation in a coherent and methodical manner.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they may be implemented. Although some modes of carrying out the present disclosure have been disclosed, those skilled in the art would recognize that other embodiments for carrying out or practicing the present disclosure are also possible.

In one aspect, an embodiment of the present disclosure provides a system for context-based abbreviation disambiguation, the system comprising:

an ontological databank represented into a multi-dimensional space;

a synonym databank;

a glossary databank; and a server arrangement communicably coupled to the ontological databank, the synonym databank and the glossary databank, wherein the server arrangement is configured to:

obtain a text comprising at least one abbreviation and a plurality of concept phrases;

extract a target abbreviation from the at least one abbreviation in the text;

obtain, using the glossary databank, a plurality of potential expansions for the target abbreviation;

determine coordinates of each of the plurality of potential expansions and each of the plurality of concept phrases, in the multi-dimensional space using the ontological databank;

calculate a synonym match score for each of plurality of potential expansions, using synonyms of each of the plurality of potential expansions and the plurality of concept phrases, wherein the synonyms of each of the plurality of potential expansions are extracted from the synonym databank;

calculate a concept match score, using concepts relating to each of the plurality of potential expansions and the plurality of concept phrases, wherein concepts relating to each of the plurality of potential expansions are determined using the ontological databank;

calculate a context match score for each of the plurality of expansions using a comparison module, wherein a contextual embedding of each of the plurality of potential expansions in the ontological databank is compared with a contextual embedding of the target abbreviation in the text; and determine one of the plurality of potential expansions as a valid expansion of the target abbreviation based on at least one of the: synonym match score, concept match score and context match score.

In another aspect, an embodiment of the present disclosure provides a method of context-based abbreviation disambiguation, wherein the method is implemented via a system comprising a server arrangement communicably coupled to an ontological databank, a synonym databank, and a glossary databank, the method comprising the method comprising:

obtaining a text comprising at least one abbreviation and a plurality of concept phrases;

extracting a target abbreviation from the at least one abbreviation in the text;

obtaining, using the glossary databank, a plurality of potential expansions for the target abbreviation;

determining coordinates of each of the plurality of potential expansions and each of the plurality of concept phrases, in the multi-dimensional space using the ontological databank;

calculating a synonym match score for each of the plurality of potential expansions, using synonyms of each of the plurality of potential expansions and the plurality of concept phrases, wherein the synonyms of each of the plurality of potential expansions are extracted from the synonym databank;

calculating a concept match score, using concepts relating to each of the plurality of potential expansions and the plurality of concept phrases, wherein concepts relating to each of the plurality of potential expansions are determined using the ontological databank;

calculating a context match score for each of the plurality of expansions using a comparison module, wherein a contextual embedding of each of the plurality of expansions in the ontological databank is compared with a contextual embedding of the target abbreviation in the text; and determining one of the plurality of potential expansions as a valid expansion of the target abbreviation based on at least one of the: synonym match score, concept match score and context match score.

The aforesaid system for context-based abbreviation disambiguation and the aforesaid method of context-based abbreviation disambiguation provides a platform for context-based expansion of the abbreviation in the text. Specifically, the system and method disclosed herein analyzes the plurality of concept phrases constituted in the text to determine the valid expansion for the target abbreviation from amongst the plurality of potential expansions. The system determines scores pertaining to at least one of: synonyms relating to the plurality of potential expansions, concepts relating to the plurality of potential expansions and context relating to the plurality of potential expansions. More specifically, the system determines the valid expansion of the target abbreviation by analyzing at least one of the: synonym match score, the concept match score and context score. Beneficially, the system substantially eliminates confusion owing to valid expansion from the plurality of potential expansions. The system overcomes problems associated with conventional confusing trial and error methods for determining the valid expansion. Moreover, analyzing the plurality of concepts phrases in the text enables the system to determine certain valid expansion of the target abbreviation within a domain and between domains.

Furthermore, the system employs multi-dimensional space for representing ontological databank by way of hierarchical relationships. Subsequently, the system substantially reduces computational power utilized in determining the valid expansion of the target abbreviation. Additionally, the system employs robust and powerful deep machine learning algorithms for training of the system so as to determine the valid expansion for the target abbreviation from the plurality of potential expansions, thereby reducing training time and complexity for training the system in real-time.

Beneficially, the system determines the valid expansion for the target abbreviation so as to provide a reader with coherent understanding of the text. Moreover, the correct expansion for the target abbreviation may be utilized by an automated computer system so as to interpret the text. Furthermore, such the valid expansion of the target abbreviation enables unambiguous interpretation of the text, thereby facilitating the automated system to efficiently perform a variety of additional operations such as comparison of text, representation of text, and so forth.

It will be appreciated that the system for context-based abbreviation disambiguation proffers a platform to achieve a technical effect of enabling expansion of the target abbreviation by context-based analysis thereof. Moreover, the aforesaid system addresses real life hinderance owing to plurality of potential expansions obtained as expansion results for the target abbreviation so as to achieve the abovementioned technical effect. Additionally, the system enhances the operational characteristics of a computer. Typically, the system for context-based abbreviation disambiguation performs operations such as extraction of an abbreviation, obtaining potential expansions for the abbreviation, determining coordinates for the abbreviation, calculating synonym match score for the abbreviation, calculating concept match score for the abbreviation, calculating context match score for the abbreviation, and interpreting an expansion from the potential expansion for the abbreviation on the server arrangement of the system. Consequently, the performance of the computer is optimized owing to substantial decrease in the computational power utilized by the system. Additionally, the system employs unique methodology to achieve the technical effect stated above, by training the system using machine learning algorithms. It will be appreciated that the system addresses a crucial drawback associated with the abbreviation disambiguation systems by providing the aforesaid platform for overcoming the problem of indeterminate ways for expansion of abbreviation for disambiguation thereof.

Furthermore, the use of the machine learning algorithms to train the system provides greater efficiency, enhanced runtime, and efficient utilization of resources and computational power. Moreover, the machine learning algorithms are trained using unsupervised learning techniques, so as to train the system efficiently, without employing large labeled training datasets and with optimal computational power.

Additionally, the use of multi-scale recurrent neural network language model improves the computational efficiency of the machine learning algorithms and efficiently delivers the output data, thereby mitigating the vanishing gradient problem. Moreover, the multi-scale recursive neural networks enable the system to have flexible resource allocation thereby optimizing the system It will be appreciated that the aforesaid system and the aforesaid method are not limited to execute abbreviation disambiguation for only the target abbreviation from the at least one abbreviation in the text. The system and the method are employed to execute abbreviation disambiguation for each of the at least one abbreviation in the text. Moreover, the system and the method are employed to execute abbreviation disambiguation for a plurality of texts stored at various locations in a single database or in a plurality of databases. The database may comprise the plurality of texts obtained from one or more locations or the plurality of texts provided by one or more users, wherein the user is a person or a bot that operates the aforesaid system.

The system comprises the ontological databank represented into the multi-dimensional space. It will be appreciated that a given domain comprises a set of words relating to concepts, categories, and so forth of the given domain. Typically, an ontology defines properties associated with the set of words and relations therebetween in the given domain. Throughout the present disclosure, the term "ontological databank" refers to a databank that defines knowledge pertaining to the utilization of the set of words based on the properties and the relations, in the given domain. In other words, the ontological databank refers to a databank comprising semantic relations between the set of words relating to concepts, categories, and so forth in the given domain, wherein the semantic relations define at least one of: properties, relations, and utilization associated with the set of words.

Optionally, the ontological databank may be a general databank comprising semantic relations between set of words comprised in one or more languages such as English, German, French, and so forth. More optionally, the ontological databank may be a domain specific databank comprising semantic relations associated with the set of words comprised in a specific domain, in a specified language. In an example, the ontological databank may be a databank comprising semantic relations associated with set of words relating to biomedical, in English language.

Optionally, the set of words comprised in the ontological databank are content words. Typically, 'content words' refer to words that describes objects of actuality and qualities associated therewith. Such as, for example, the content words consist of at least one of: nouns, lexical verbs, adjectives, and adverbs. More optionally, the ontological databank may include multi-word expressions such as idiomatic expressions, phrasal verbs, jargon expressions, and other common expressions.

Furthermore, optionally, each word from amongst the set of words in the ontological databank is described as a lexical entry. The description of each of the words in the lexical entry is determined by a function or a purpose of creation of the ontological databank. Specifically, the description of a word from amongst the set of words in the ontological databank in the lexical entry may include at least one of: a property pertaining to spelling of the word or sound of the word, grammatical behavior of the word, meaning of the word, use of the word, and nature of semantic relations of the word with other words in the ontological databank. Therefore, it will be appreciated that the lexical entry of each of the words in the ontological databank comprise records relating to linguistic behavior of each of the words and meaning associated therewith.

More optionally, the ontological databank is referred as a databank wherein a semantic relation between each of the words from amongst the set of words is mapped to information relating therewith. It will be appreciated that words having more than one (namely, multiple) syntactics have separate lexical entries associated with each of the syntactics related therewith. For example, a word 'flex' will have a first lexical entry as a noun referring to 'an insulating material' and a second lexical entry as a verb referring to 'an act of flexing'. Moreover, a single word may have separate lexical entries associated therewith, owing to homonym or polysemy nature of the word.

It will be appreciated that a word may have a plurality of morphological variants, such as a plurality of nouns, plurality of inflected forms, and so forth. In such case, the word may not have separate lexical entries pertaining to the plurality of morphological variants. Alternately, the lexical entry associated with base form of the word may consists of additional number of pointers pointing towards the plurality of morphological variants. In an example, a lexical entry pertaining to 'gives', 'giving', 'gave', and 'given' is understood to be inflected form for the base form of verb 'give'. Therefore, the lexical entry pertaining to the inflected forms of the verb will point to the base form of the verb. Additionally, optionally, the base form of the word may further point towards the inflected forms of the words.

The ontological databank is represented into a multi-dimensional space. In other words, the set of words comprised in the ontological databank is embedded into the multi-dimensional space. Throughout the present disclosure, the term "multi-dimensional space" refers to an embedding space, wherein semantic relations (in form of, paths) are established between a plurality of words. Pursuant to embodiments of the present disclosure, the multi-dimensional space embeds the set of words comprised in the ontological databank such that meaning of each of the words, in the set of words, is derived from a characteristic of embedding of the word in the multi-dimensional space.

It will be appreciated that the set of words embedded in the multi-dimensional space has semantic relations with one another. Furthermore, optionally, the multi-dimensional space is represented as a tree structure. Pursuant to embodiments of the present disclosure, the term 'node' refers to a word from amongst the set of words in the ontological databank, wherein the ontological databank is represented as the tree structure (namely, a node-link structure). Typically, in the tree structure, a node includes a pointer (namely, address) to a parent node. It will be appreciated that the node may or may not have a child node. Consequently, the node may or may not include a pointer to the child node. Moreover, the node may have 0, 1, 2, 3, and so on, number of child node associated therewith. The multi-dimensional space uses the tree structure to establish sematic relations between the set of words, in the ontological databank. Typically, the tree structure is instigated by a root node (namely, starting point of the tree), wherein the root node is the highest-level node. The tree structure is terminated by leaf nodes (namely, ending point of the tree), wherein the leaf nodes are the bottom-level nodes.

It will be appreciated that the tree structure is a general class of node-link structure. Furthermore, the system and the method described in the present disclosure may be implemented so as to support alternative node-link structures.

Typically, embedding of the set of words in the multi-dimensional space, organizes (namely, sorts) the set of words such that the multi-dimensional space reflects semantic and functional relations (such as, similarity) amongst the set of words in the ontological databank. Optionally, a distance between a word from remainder of words (or, a length of a path between a word from remainder of words), in the lexicon ontology, may define semantic relation of the word with the remainder of the words. The semantic relations further reflect homophily properties associated with each of the words, in the set of words, found in real-world networks.

Optionally, the multi-dimensional space is a hyperbolic space. Specifically, the hyperbolic space represents the ontological databank by way of a hyperbolic geometry structure that may be modeled in two-dimensions. In an example, the hyperbolic geometry structure models the leaf nodes at exactly 'l' level, below the root node, in a sphere space with a radius 'r', wherein the radius 'r' is proportional to 'l'. The nodes that are less than 'l' level below the root node are placed within the sphere in the hyperbolic space. It will be appreciated that the hyperbolic space will grow exponentially with the radius of the sphere. Beneficially, the hyperbolic space embeds complex hierarchies having increased number of nodes in reduced dimensionality. Consequently, the hyperbolic space requires minimal computational power and resources to determine a semantic relation of a word with the remainder of words comprised in the ontological databank, without a loss of information. Furthermore, the hyperbolic space operates at reduced runtime and memory complexity. A person skilled in the art will appreciate that the hyperbolic space may be implemented by way of a plurality of models such as Beltrami-Klein model, hyperboloid model, Poincaré half-plane model, and so forth.

More optionally, the hyperbolic space may be represented in form of a Poincaré half-plane model. In such case, words from the set of words (represented as, nodes) are represented by way of a Poincaré ball, wherein the distance within the Poincaré ball changes with respect to the distance of the nodes in the hyperbolic space. The Poincaré half-plane model depicts the hyperbolic space in form of continuous embeddings, based on a relation between distance of nodes within the Poincaré ball and the distance of the nodes in the hyperbolic space. In an example, a root node of a tree structure may be placed at an origin of a Poincaré ball in a Poincaré half-plane model. In such case, leaf nodes of the tree structure may be placed close to the boundary of the Poincaré ball in the Poincaré half-plane model. Furthermore, the nodes between the root node and the leaf nodes may be represented in the Poincaré ball, enclosed within. Optionally, the multi-dimensional space is a multi-dimensional hierarchical space or a multi-dimensional Euclidean space.

The system comprises the synonym databank. Notably, 'synonyms' defines words having same meaning or nearly same meaning as a given word, in a given language associated with the given word. For example, in English, a word 'happy' may have synonyms such as 'joyful', 'elated', 'content', 'cheerful', 'jovial', and so forth. In other words, the synonyms refer to the words or expressions that may be accepted as another name or replacement of the given word. It will be appreciated that the synonyms are not limited to words. Subsequently, synonyms may exist for a word, a phrase, a multi-word expression such as idiomatic expression, phrasal verb, jargon expression, and other common expressions, and so forth.

Moreover, the "synonym databank" refers to a databank comprising semantic relations between a plurality of words that may be used interchangeably. Specifically, the synonym databank provides words having a meaning similar to the given word in at least one context, to the system. Typically, such words having similar meaning are interchangeable with the given word. Optionally, in an embodiment, a noun relating to the given word may have a meaning similar to the given word thereby making it a synonym for the given word. In such case, a reference synonym drawn from the given word and the noun remains constant. In an example, 'a Dalmatian' referring to a coach dog may be a synonym for 'dog'.

Furthermore, it is to be understood that synonym words have overlapping meaning as the given word. However, the synonym words may differ by way of emphasis and connotation. In an example, a word 'make' may be a synonym for a word 'construct'. However, the word 'make' may not be interchangeable with the word 'construct' in a sentence 'make a cake', owing to different context. Pursuant to embodiments of the present disclosure, the synonym databank establishes semantic relation between the plurality of concept phrases and synonyms associated therewith. Moreover, the synonym databank further establishes semantic relation between the plurality of potential expansions and synonyms associated therewith.

The system further comprises the glossary databank. Throughout the present disclosure, the term "glossary databank" refers to a databank comprising a list of words or phrases relating to a domain. The glossary databank further comprises explanation pertaining to the list of words or phrases stored therein. Optionally, the glossary databank may be specific to a dialect. Pursuant to embodiments of the present disclosure, the glossary databank comprises a list of the plurality of potential expansions for a plurality of abbreviations. In an embodiment, the plurality of abbreviations may include each of the abbreviations comprehending a specific field in a domain. In such case, the specific field may be, for example, mechanical engineering, neurology, psychology, physics, and so forth. In another embodiment, the plurality of abbreviations may include each of the abbreviations comprehending a domain encompassing a plurality of fields. In such case, the domain may be engineering, biomedical, history, quantum physics, and so forth. In yet another embodiment, the plurality of abbreviations may include each of the abbreviations comprehending plurality of domains.

Optionally, the glossary databank may include a definition of each of the words or phrases from the list of words or phrases, included therein. In accordance with the present invention, the glossary databank may include the plurality of potential expansions for the plurality of abbreviations and definition of each of the plurality of potential expansions. Optionally, in an embodiment, the glossary databank may be represented in form of an alphabetical list of the words or phrases comprised therein. In another embodiment, the glossary databank may be represented in form of an alphabetical table of the words or phrases comprised therein.

The system comprises the server arrangement communicably coupled to the ontological databank, the synonym databank, and the glossary databank. Throughout the present disclosure, the term "server arrangement" refers to an arrangement of one or more servers that includes one or more processors configured to perform various operations, for example, as mentioned earlier. Optionally, the server arrangement includes any arrangement of physical or virtual computational entities capable of performing the various operations. The term "one or more processors" may refer to one or more individual processors, processing devices and various elements associated with a processing device that may be shared by other processing devices. Additionally, the one or more individual processors, processing devices and elements are arranged in various architectures for responding to and processing the instructions that drive the aforesaid system.

Moreover, it will be appreciated that the server arrangement can be implemented by way of a single hardware server. The server arrangement can alternatively be implemented by way of a plurality of hardware servers operating in a parallel or distributed architecture. As an example, the server arrangement may include components such as memory, a processor, a network adapter, and the like, to store and process information pertaining to the document and to communicate the processed information to other computing components, for example, such as a client device.

In an embodiment, any of the: ontological databank, synonym databank, and glossary databank may be stored at a database arrangement coupled with the server arrangement. In another embodiment, any of the: ontological databank, synonym databank, and glossary databank may be stored at a database comprised within the server arrangement. Optionally, the database arrangement comprises one or more databases.

The term "database arrangement" as used herein relates to an organized body of digital information regardless of the manner in which the data or the organized body thereof is represented. Optionally, the database may be hardware, software, firmware and/or any combination thereof. For example, the organized body of related data may be in the form of a table, a map, a grid, a packet, a datagram, a file, a document, a list or in any other form. The database includes any data storage software and systems, such as, for example, a relational database like IBM DB2 and Oracle 9. Optionally, the database may be operable to support relational operations, regardless of whether it enforces strict adherence to the relational model, as understood by those of ordinary skill in the art.

The server arrangement is configured to obtain the text comprising at least one abbreviation and the plurality of concept phrases. Throughout the present disclosure, the term "text" refers to a file or a document in which information is recorded, wherein the information is recorded by way of one or more datatype. Specifically, text refers to a piece of written or printed material (such as, information), wherein the text is written or printed so as to convey a primary form of the information relating to a particular work. Thus, text may be in any suitable file formats depending upon the datatype comprised therein.

Furthermore, the text comprises at least one abbreviation and a plurality of concept phrases. It will be appreciated that the text adheres to a domain associated therewith. Typically, the term "at least one abbreviation" refers to a shortened form of a given word or a given phrase that is derived from letters of the word or the phrase. Specifically, abbreviations are used as a replacement for the given word or the given phrase. Typically, the at least one abbreviation allows an author of the text to convey concepts relating to domain of the text to a reader, without encumbering the reader with full expansion of the abbreviation repeatedly.

Moreover, the "plurality of concept phrases" comprised in the text refers to a basic unit of language that expresses a complete idea. The idea expressed by the plurality of concept phrases relates to the domain associated with the text. In other words, the plurality of concept phrases contained in the text conveys a description relating to the domain associated with the text. Optionally, the plurality of concept phrases follows grammatical rules and syntaxes for formation thereof. Furthermore, in an example, the plurality of concept phrases comprised in the text may refer to a set of keywords, a set of sentences, a set of phrases, and/or a combination thereof.

Optionally, the server arrangement is configured to extract the at least one abbreviation from the text using a defined search pattern. Specifically, the term "defined search pattern" refers to a special text string (such as, a set of codes), wherein the special text string is operable to perform operations on the text. In accordance with an embodiment of the present disclosure, the defined search pattern is employed by the server arrangement to perform operations such as 'find' and/or 'find and replace' for the at least one abbreviation in the text.

More optionally, in an embodiment, the defined search pattern may extract the at least one abbreviation from the text by way of implementing the special text string so as to identify a sequence of characters. In an example, the at least one abbreviation may be extracted by identifying a sequence of uppercase characters (namely, capital characters) in the text. In another example, the at least one abbreviation may be extracted by identifying a sequence of characters, wherein the sequence of characters initiates with an uppercase character and terminates with a period. Examples of identified sequence of characters as the at least one abbreviation may include, but are not limited to, OCDS, ODCS, PTO, Dr., Mr., J., MS, URI, and so forth.

It will be appreciated that the defined search pattern is recorded (such as, written) in a specific computing language. Examples of the specific computing language employed for recording the defined search pattern may include, but are not limited to, JavaScript, Perl, POSIX, Awk, TCL, Ruby, C++, C, and so forth. Beneficially, the defined search pattern automatically extracts the at least one abbreviation from the text, thereby saving time required for parsing large amount of text so as to extract the at least one abbreviation.

The server arrangement is further configured to extract the target abbreviation from the at least one abbreviation in the text. Typically, the term "target abbreviation" refers to one of the at least one abbreviation comprised in the text, wherein the target abbreviation is an abbreviation to be disambiguated. Specifically, the server arrangement is configured to perform various operations, for example, as mentioned earlier, so as to disambiguate the target abbreviation. It will be appreciated that each of the at least one abbreviation may be the target abbreviation at a given time.

Optionally, the target abbreviation may be provided by the user. The server arrangement may analyze the text so as to extract the at least one abbreviation. In an embodiment, the server arrangement may extract one of the at least one abbreviation as the target abbreviation. In another embodiment, the user may designate (such as, select) the target abbreviation from the at least one abbreviation.

The server arrangement is configured to obtain, using the glossary databank, the plurality of potential expansions for the target abbreviation. As mentioned previously, the glossary databank comprises the list of the plurality of potential expansions for the plurality of abbreviations. Pursuant to embodiments of the present disclosure, the server arrangement communicates with the glossary databank to obtain the plurality of potential expansions for the target abbreviation. In an example, for a target abbreviation 'ODCS', the server arrangement may obtain the plurality of potential expansions within a specific domain of biomedical as: 'Oligodendrocyte', 'Octadecyldimethylchlorosilane' and 'Octyldimethylchlorosilane'. In another example, for a target abbreviation 'MS', the server arrangement may obtain the plurality of potential expansions in between domains as: 'Manuscript', 'Multiple sclerosis', 'Master of Science' and 'Microsoft Corporation'.

It will be appreciated that the system will perform the abovementioned operations for context-based disambiguation of the target abbreviation provided that there exists a plurality of potential expansions for the target abbreviation. In other words, the abovementioned operations for the context-based disambiguation of the target abbreviation will not be performed for a target abbreviation having a unitary potential expansion. In such case, the unitary potential expansion may be considered as the valid expansion for the target abbreviation.

The server arrangement is configured to determine coordinates of each of the plurality of potential expansions and each of the plurality of concept phrases, in the multi-dimensional space using the ontological databank. It will be appreciated that the multi-dimensional space embeds the set of words comprising the ontological databank such that meaning of each of the words, in the set of words, is derived from the multi-dimensional space.

Typically, the term "coordinates" refer to a location of a node in the multi-dimensional space, wherein the location is specified by a set of numbers, letters, symbols, or a combination thereof. It will be appreciated that each word from amongst the set of words in the ontological databank represented into the multi-dimensional space have a defined coordinate. Pursuant to embodiments of the present disclosure, the server arrangement determines coordinates of each of the plurality of potential expansions and coordinates of each of the plurality of concept phrases in the multi-dimensional space.

Notably, the coordinates of each of the plurality of potential expansions and each of the plurality of concept phrases embedded in the multi-dimensional space specify unique location associated therewith, in the multi-dimensional space. Moreover, in an embodiment, the coordinates of each of the plurality of potential expansions and each of the plurality of concept phrases, in the multi-dimensional space may be defined by a set of numbers in Euclidean cartesian coordinate form such as [−0.22, 0.22, 0.221, 0.3443]. In another embodiment, the coordinates of each of the plurality of potential expansions and each of the plurality of concept phrases, in the multi-dimensional space may be defined by a combination of numbers and characters in vector form such as (−0.22x+0.22iy). In an example, for a target abbreviation 'ODCS', a first potential expansion 'Oligodendrocyte' may have coordinates as [0.22, 0.27, 0.303], second potential expansion 'Octadecyldimethylchlorosilane' may have coordinates as [0.256, 0.290, 0.603] and third potential expansion 'Octyldimethylchlorosilane' may have coordinates as [0.289, 0.295, 0.601].

The server arrangement is configured to calculate the synonym match score for each of plurality of potential expansions, using synonyms of each of the plurality of potential expansions and the plurality of concept phrases, wherein the synonyms of each of the plurality of potential expansions are extracted from the synonym databank. Throughout the present disclosure, the term "synonym match score" refers to a score assigned by the server arrangement, to each of the plurality of potential expansions of the target abbreviation, thereby enabling identification of the valid expansion from amongst the plurality of potential expansions. Specifically, the synonym match score refers to a weight assigned to each of the plurality of potential expansions based on the synonyms associated therewith, wherein the weight is assigned to a given potential expansion based on similarity between the synonyms of the given potential expansion and the plurality of concept phrases comprised in the text.

Optionally, the server arrangement is configured to determine the synonym match score by:

determining synonyms of each of the plurality of potential expansions using the synonym databank;

determining coordinates of each of the synonyms in the multi-dimensional space using the ontological databank; and determining the synonym match score for each of the plurality of potential expansions, wherein synonym match score for a given potential expansion is determined based on a proximity match of the coordinates of synonyms of the given potential expansion with the coordinates of the plurality of concept phrases in the multi-dimensional space.

As mentioned previously, the synonym databank comprises semantic relation between the plurality of concept phrases, synonyms associated with the plurality of concept phrases, the plurality of potential expansions and synonyms associated with the plurality of potential expansions based on a context and/or use. Specifically, the server arrangement employs the synonym databank so as to determine synonyms associated with each of the plurality of potential expansions.

In an embodiment, the given potential expansion of the target abbreviation may be a set of words. In such case, the server arrangement may determine synonyms related to each of the set of words comprising the given potential expansion and subsequently relate synonyms to the given potential abbreviation based on the context and/or use. In another embodiment, the given potential expansion may be a word or a phrase. In a first example, a given potential expansion for a target abbreviation 'PTO' may be 'Please Turn Over'. In such example, synonyms for a first word 'Please' may include 'pleasurable', 'pleasant', 'kindly', and 'request'. Synonyms for a second word 'Turn' may include 'twist', 'pivot', 'become', 'consider', 'refer', and 'pass'. Synonyms for a third word 'Over' may include 'above', 'other', 'next', 'finish', and 'across'. Consequently, the synonym for please turn over may be 'kindly consider next', and 'kindly refer other side'. In a second example, a given potential expansion for a target abbreviation 'ODCS' may be 'Oligodendrocytes'. In such case, the synonyms may be 'Oligodendrocyte', 'Neurogliacyte', 'Glial cell', 'Neuroglial cell' and 'Oligodendria'.

Furthermore, the synonym match score is determined by determining coordinates of each of the synonyms in the multi-dimensional space using the ontological databank. It will be appreciated that coordinates refer to a location of each of the synonyms, in the multi-dimensional space. Specifically, the coordinates of each of the synonyms define the location thereof by way of a set of numbers, letters, symbols, or a combination thereof, in the multi-dimensional space representing the ontological databank.

In an example, the given potential expansion for the target abbreviation 'ODCS' may be 'Oligodendrocytes'. In such case, a first synonym 'Oligodendrocyte' may have coordinates [0.22, 0.27, 0.301], a second synonym 'Neurogliacyte' may have coordinates [0.21, 0.274, 0.309], a third synonym 'Glial cell' may have coordinates [0.2002, 0.268, 0.303], a fourth synonym 'Neuroglial cell' may have coordinates [0.213, 0.27, 0.306].

The synonym match score is determined by determining the synonym match score for each of the plurality of potential expansions, wherein synonym match score for the given potential expansion is determined based on the proximity match of the coordinates of synonyms of the given potential expansion with the coordinates of the plurality of concept phrases in the multi-dimensional space. Throughout the present disclosure, the term "proximity match" refers to matching the proximity of a first node in the multi-dimensional space with a second node. Moreover, the proximity match between the first node and the second node is calculated by calculating closeness (or, nearness) of the second node with the first node. Pursuant to embodiments of the present disclosure, the first node refers to the coordinates of synonyms of the given potential expansion. On the other hand, the second node refers to coordinates of the plurality of concept phrases. Subsequently, the synonym match score for the given potential expansion is determined by calculating the proximity match of the coordinates of synonyms of the given potential expansion with the coordinates of the plurality of concept phrases in the text.

Specifically, coordinate relating to a first synonym from the synonyms of the given potential expansion is compared with the coordinates of at least one of the plurality of concept phrases to determine a distance therebetween. Similarly, distance between each of the synonyms of each of the potential expansions and at least one of the plurality of concept phrases is determined. In an embodiment, distance is determined between a first synonym of the given potential expansion and a first concept phrase from the plurality of concept phrases, wherein the distance between the first concept phrase and the first synonym is smallest.

In an embodiment, the synonym match score for the given potential expansion may be determined by calculating an average of distances determined, between coordinates of each of the synonyms of the given potential expansion and the coordinates of the plurality of concept phrases. In an example, the given potential expansion may be 'Oligodendrocytes' having a first synonym 'Oligodendrocyte', a second synonym 'Neurogliacyte', a third synonym 'Glial cell', and a fourth synonym 'Neuroglial'. Subsequently, a first synonym match score may be '2', a second synonym match score may be '4', a third synonym match score may be '−4', and a fourth synonym match score may be '6'. Consequently, the synonym match score for the given potential expansion may be '2' calculated as an average.

Moreover, synonym match score for each of the plurality of potential expansions is determined. In an example, a target abbreviation may have three potential expansions. In such case, the synonym match score of a first potential expansion may be '1', the synonym match score of a second potential expansion may be '4', the synonym match score of a third potential expansion may be '15'. In such case, coordinates of synonyms of the third potential expansion relates closely to the coordinates of the plurality of concept phrases in the text. Moreover, it will be appreciated that the third potential expansion, having the highest synonym match score, may be the valid expansion for the target abbreviation.

The server arrangement is configured to calculate a concept match score, using concepts relating to each of the plurality of potential expansions and the plurality of concept phrases, wherein concepts relating to each of the plurality of potential expansions are determined using the ontological databank. Throughout the present disclosure, the term "concept match score" refers to a score assigned by the server arrangement, to each of the potential expansions of the target abbreviation, thereby enabling identification of the valid expansion from amongst the plurality of potential expansions. Specifically, the concept match score refers to weight assigned to each of the plurality of potential expansions based on the concept associated therewith, wherein the weight is assigned to a given potential expansion based on a similarity between the concepts associated with the given potential expansion and the plurality of concept phrases comprised in the text.

Optionally, the server arrangement is configured to determine the concept match score by:

determining concepts relating to each of the plurality of potential expansions using the ontological databank;

determining coordinates of each of the concepts in the multi-dimensional space using the ontological databank; and determining the concept match score for each of the plurality of potential expansions, wherein concept match score for a given potential expansion is determined based on a proximity match of the coordinates of concepts of the given potential expansion with the coordinates of the plurality of concept phrases in the multi-dimensional space.

Specifically, the ontological databank comprises semantic relations between the set of words relating to concepts, categories, and so forth associated with domain. In accordance with the present invention, the ontological databank defines semantic relations between the plurality of concept phrases in the text and the plurality of potential expansions. Moreover, the ontological databank defines semantic relations between the plurality of potential expansions and the concepts associated therewith. More specifically, the server arrangement employs the ontological databank so as to determine concepts associated with each of the plurality of potential expansions by analyzing the semantic relations of the plurality of potential expansions.

In an embodiment, the given potential expansion for the target abbreviation 'ODCS' may be 'Oligodendrocytes'. In such case, the server arrangement may determine concepts related to the given potential expansion as: 'Central Nervous System', 'Ventral Neural Tube', and 'Embryonic Spinal'.

Subsequently, the concept match score is determined by determining coordinates of each of the concepts in the multi-dimensional space using the ontological databank. It will be appreciated that coordinates refer to a location of a node in the multi-dimensional space. Specifically, the coordinates of each of the concepts define a location of each of the concepts by way of: a set of numbers, a set of letters, a set of symbols, or a combination thereof.

In an example, the given potential expansion for the target abbreviation 'ODCS' may be 'Oligodendrocytes'. In such case, a first concept 'Central Nervous System' may have coordinates [0.24, 0.218, 0.356], a second concept 'Ventral Neural Tube' may have coordinates [0.26, 0.299, 0.378], and a third concept 'Embryonic Spinal' may have coordinates [0.204, 0.2664, 0.322].

Furthermore, the concept match score is determined by determining the concept match score for each of the plurality of potential expansions, wherein concept match score for a given potential expansion is determined based on a proximity match of the coordinates of concepts of the given potential expansion with the coordinates of the plurality of concept phrases in the multi-dimensional space.

As mentioned previously, proximity match refers to matching the proximity of a first node in the multi-dimensional space with a second node. Moreover, the proximity match between the first node and the second node is determined by calculating closeness (or, nearness) of the second node with the first node. Pursuant to embodiments of the present disclosure, the first node refers to the coordinates of concepts relating to the given potential expansion. On the other hand, the second node refers to coordinates of the plurality of concept phrases comprised in the text. Subsequently, the concept match score for the given potential expansion is determined by calculating the proximity match of the coordinates of concepts relating to the given potential expansion with the coordinates of the plurality of concept phrases in the text.

Furthermore, coordinate relating to a first concept from the concepts relating to the given potential expansion is compared with the coordinates of at least one of the plurality of concept phrases to determine a distance therebetween.

Similarly, distance between each of the concepts relating to each of the potential expansions and at least one of the plurality of concept phrases is determined. In an embodiment, distance is determined between a first concept from the concepts relating to the given potential expansion and a first concept phrase from the plurality of concept phrases, wherein the distance between the first concept phrase and the first concept is smallest.

In an embodiment, concept match score for the given potential expansion may be determined by calculating an average of distances determined, between the coordinates of each of the concepts relating to the given potential expansion and the coordinates of at least one of the plurality of concept phrases. In an example, the given potential expansion may be 'Oligodendrocytes' having a first concept 'Central Nervous System', a second concept 'Ventral Neural Tube', and a third concept 'Embryonic Spinal'. Subsequently, a first concept match score may be '10', a second concept match score may be '2', and a third concept match score may be '−3'. Consequently, the concept match score for the given potential expansion may be '3' calculated as an average thereof.

Moreover, the concept match score for each of the plurality of potential expansions is determined. In an example, a target abbreviation may have three potential expansions. In such case, the concept match score of a first potential expansion may be '1', the concept match score of a second potential expansion may be '3', the concept match score of a third potential expansion may be '−5'. In such case, coordinates of concepts relating to the second potential expansion relates closely to the coordinates of the plurality of concept phrases in the text. Moreover, it will be appreciated that the second potential expansion, having the highest concept match score, may be the valid expansion for the target abbreviation.

The server arrangement is configured to calculate the context match score for each of the plurality of potential expansions using the comparison module, wherein the contextual embedding of each of the plurality of potential expansions in the ontological databank is compared with the contextual embedding of the target abbreviation in the text. Throughout the present disclosure, the term "contextual embedding" refers to embedding of individual word in the text, based on a context of the text. Specifically, the individual word in the text is contextually embedded in the multi-dimensional space so as to obtain a coordinate associated with the individual word. Pursuant to embodiments of the present disclosure, the target abbreviation is contextually embedded in the multi-dimensional space, based on the context relating to the target abbreviation in the text. Furthermore, each of the plurality of potential expansions is contextually embedded in the multi-dimensional space based on context relating to each of the plurality of potential expansions in the text.

Throughout the present disclosure, the term "context match score" refers to a numerical value or a point obtained upon relative comparison of a first coordinate with a second coordinate. Pursuant to embodiments of the present disclosure, the first coordinate belongs to the contextual embedding of the given potential expansion in the multi-dimensional space. Conversely, the second coordinate belongs to the contextual embedding of the target abbreviation in the multi-dimensional space. In an embodiment, the context match score is generated upon determining a dot product (namely, a cosine product) between the first coordinate and the second coordinate, in the multi-dimensional space.

Furthermore, the term "comparison module" refers to a module operable to compare the contextual embedding of the given potential expansion with the contextual embedding of the target abbreviation in the text, so as to generate the context match score. The comparison module further compares contextual embedding of each of the plurality of potential expansion with the contextual embedding of the target abbreviation in the text, so as to generate a corresponding context match score.

Optionally, the comparison module employs machine learning algorithms. Specifically, the 'machine learning algorithms' refer to a category of algorithms employed by the comparison module that allows the comparison module to become more accurate in determining the context match score pertaining to contextual embedding of each of the plurality of potential expansion, without being explicitly programmed. Specifically, the machine learning algorithms are employed to artificially train the comparison module so as to enable the comparison module to automatically learn, from analyzing training dataset and improve performance from experience, without being explicitly programmed.

It will be appreciated that the machine learning algorithms employed by the comparison module is trained using a training dataset. Optionally, the comparison module may be trained using different types of machine learning algorithms, depending upon the training dataset employed. Typically, examples of the different types of machine learning algorithms, depending upon the training dataset employed for training the comparison module comprise, but are not limited to: supervised machine learning algorithms, unsupervised machine learning algorithms, semi-supervised learning algorithms, and reinforcement machine learning algorithms. Furthermore, the comparison module is trained by interpreting patterns in the training dataset and adjusting the machine learning algorithms accordingly to get a desired output.

More optionally, the comparison module, employing the machine learning algorithms, is trained using semi-supervised learning techniques. The term "semi-supervised learning techniques" refers to a learning technique employed by the machine learning algorithms to train the comparison module using a labeled training dataset as well as an unlabeled training dataset. Specifically, the labeled training dataset comprises a small corpus of labeled data for supervised learning of the comparison module. Furthermore, the unlabeled training dataset comprises a comparatively large corpus of unlabeled data for unsupervised learning of the comparison module. Beneficially, semi-supervised learning techniques significantly improves the quality of generated output and reduces training time for the machine learning algorithms.

It will be appreciated that the semi-supervised learning techniques comprises an initial supervised learning of the machine learning algorithms using labeled training dataset and eventual unsupervised learning of the machine learning algorithms using unlabeled training dataset. Notably, 'supervised learning' refers to a learning technique employed by the machine learning algorithms, wherein the machine learning algorithms predict future outputs by learning from the labeled training datasets provided thereto. Moreover, 'unsupervised learning' refers to a learning technique employed by the machine learning algorithms to train the comparison module using unlabeled training dataset or unstructured training information.

Optionally, the labeled training dataset for semi-supervised learning of the comparison module comprises labeled publications relating to a first set of sentences as a similar-context training dataset and labeled publications relating a second set of sentences as a dissimilar-context training dataset. Moreover, the labeled training dataset comprises a context match score pertaining to the similar-context training dataset and the dissimilar-context training dataset. In an embodiment, the context match score for training the comparison module may have a defined range. In an example, the range defined for context match score may be between '0' and '1'. In such case, the first set of sentences constituting the similar-context training dataset may have a context match score near to '1'. Alternately, the second set of sentences constituting the dissimilar-context training dataset may have a context match score near to '0'. Furthermore, the unlabeled training data set for subsequent unsupervised training of the comparison module may comprise, but are not limited to, novels, research papers, newsletters, journals, bulletins, factsheets, reports, summaries, portable guides, and a combination thereof.

Optionally, the machine learning algorithms comprise multi-scale recursive neural network language model. Notably, "multi-scale recursive neural network language model" refers to a computing system (such as, machine learning algorithms) that 'learns' representation of hierarchical multiscale structure from temporal data, without being explicitly programmed. Typically, the recursive neural network language model comprises at least one of: an input layer, a plurality of hidden layers, and an output layer. Pursuant to embodiments of the present disclosure, the input layer is provided with the target abbreviation and the plurality of potential expansions as input data. The output layer provides the context match score relating to each of the plurality of potential expansion by performing operation thereon. Moreover, the hidden states are operable to perform the operations on the input data such as analyzing the contextual embedding of the target abbreviation and the plurality of potential expansions, so as to determine the context match score. Furthermore, layers of the recursive neural network language model perform operation by analyzing an input data from previous layer and an output data of the current layer.

Furthermore, beneficially, the multi-scale recursive neural network model improves the computational efficiency of the machine learning algorithms and efficiently delivers the output data, thereby mitigating the vanishing gradient problem.

The server arrangement is configured to determine one of the plurality of potential expansions as the valid expansion of the target abbreviation based on at least one of the: synonym match score, concept match score and context match score. Specifically, the server arrangement determines the synonym match score, the concept match score, and the context match score in succession. It will be appreciated that the server arrangement determines the valid expansion based only the synonym match score, wherein synonym match score for a given potential expansion is substantially high from synonym match score for remaining potential expansions. However, the server arrangement further calculates the concept match score upon obtaining synonym match scores for each of the plurality of potential expansion lying in a substantially close range.

Moreover, the server arrangement determines the valid expansion based only the concept match score, wherein concept match score for a given potential expansion is substantially high from concept match score for remaining potential expansions. However, the server arrangement further calculates the context match score upon obtaining concept match scores for each of the plurality of potential expansions lying in a substantially close range.

Optionally, upon obtaining substantially discriminatory context match scores for the plurality of potential expansions, the valid expansion is identified. However, upon obtaining substantially similar context match score, a non-mappable comment is flagged by the system to the user. In such case, the user may refer to the examples (such as, the training datasets) cited by the system, so as to map the target abbreviation with the valid expansion.

For illustration purposes only, there will now be considered an example network environment, wherein a system for context-based abbreviation disambiguation can be implemented pursuant to embodiments of the present disclosure. One such network environment has been illustrated in conjunction with FIG. 1 as explained in more detail below.

Figure 1:
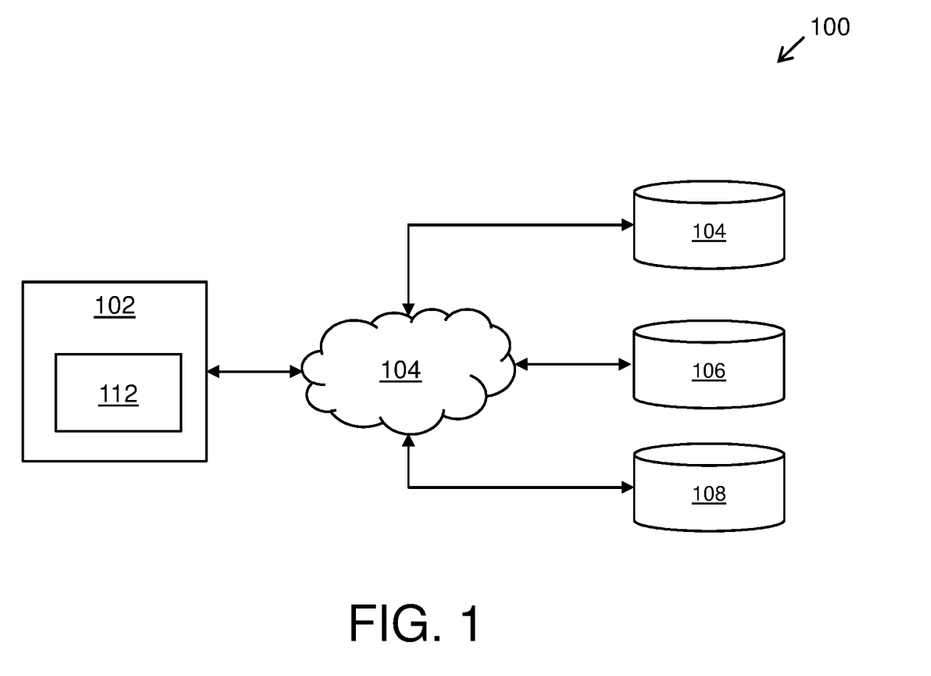
FIG. 1 is a schematic illustration of a network environment, wherein a system for context-based abbreviation disambiguation is implemented, in accordance with an embodiment of the present disclosure.

The network environment includes an ontological databank of the system, a synonym databank of the system, a glossary databank of the system and a server arrangement of the system. The server arrangement, comprising one or more processors, is communicably coupled via the one or more data communication networks with the ontological databank of the system, the synonym databank of the system, and the glossary databank of the system. Optionally, the network environment also includes a plurality of databases communicably coupled via the one or more data communication networks with the one or more processors of the server arrangement.

The one or more data communication networks can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, fifth generation (5G) telecommunication networks and Worldwide Interoperability for Microwave Access (WiMAX) networks.

It will be appreciated that there may be a plurality of ontological databank, synonym databank, and glossary databank pertaining to different concepts or domains. In an example, the plurality of databanks may relate to biomedical domain. In another example, the plurality of databanks may relate to energy domain. In yet another example, the plurality of databanks may relate to automobile domain.

It will be appreciated that it is not necessary for the one or more processors of the server arrangement to be coupled in communication with all of the ontological databank, synonym databank, and glossary databank simultaneously at all times.

The one or more processors of the server arrangement are configured to execute machine readable instructions that cause the server arrangement to perform operations, for example, as illustrated with respect to the aforementioned aspect.

Moreover, the present description also relates to the method as described above. The various embodiments and variants disclosed above apply mutatis mutandis to the method.

Optionally, the method comprises determining the synonym match score by:

determining synonyms of each of the plurality of potential expansions using the synonym databank;

determining coordinates of each of the synonyms in the multi-dimensional space using the ontological databank; and determining the synonym match score for each of the plurality of potential expansions, wherein synonym match score for a given potential expansion is determined based on a proximity match of the coordinates of synonyms of the given potential expansion with the coordinates of the plurality of concept phrases in the multi-dimensional space.

Optionally, the method comprises determining the concept match score by:

determining concepts relating to each of the plurality of potential expansions using the ontological databank;

determining coordinates of each of the concepts in the multi-dimensional space using the ontological databank; and determining the concept match score for each of the plurality of potential expansions, wherein concept match score for a given potential expansion is determined based on a proximity match of the coordinates of concepts of the given potential expansion with the coordinates of the plurality of concept phrases in the multi-dimensional space.

Optionally, the comparison module employs machine learning algorithms.

Optionally, the machine learning algorithms comprise multi-scale recursive neural network language model.

Optionally, the method comprises extracting the target abbreviation from the text using a defined search pattern.

Optionally, the multi-dimensional space is a hyperbolic space.

DETAILED DESCRIPTION OF THE DRAWINGS

Referring now to the drawings, particularly by their reference numbers, FIG. 1 is a schematic illustration of a network environment 100, wherein a system for context-based abbreviation disambiguation is implemented, in accordance with an embodiment of the present disclosure. The network environment 100 comprises a server arrangement 102 including one or more processors, an ontological databank 104, a synonym databank 106, and a glossary databank 108. The server arrangement 102 is communicably coupled via one or more data communication networks (depicted as a data communication network 110) with the ontological databank 104, the synonym databank 106, and the glossary databank 108. Furthermore, the server arrangement 102 comprises a comparison module 112, wherein the comparison module is operable to determine context match score for each of the plurality of potential expansions.

FIG. 1 is merely an example, which should not unduly limit the scope of the claims herein. It is to be understood that the specific designation for the network environment 100 is provided as an example and is not to be construed as limiting the network environment 100 to specific numbers, types, or arrangements of server arrangements, communication networks and lexicon ontology databanks. A person skilled in the art will recognize many variations, alternatives, and modifications of embodiments of the present disclosure.

Figure 2A:
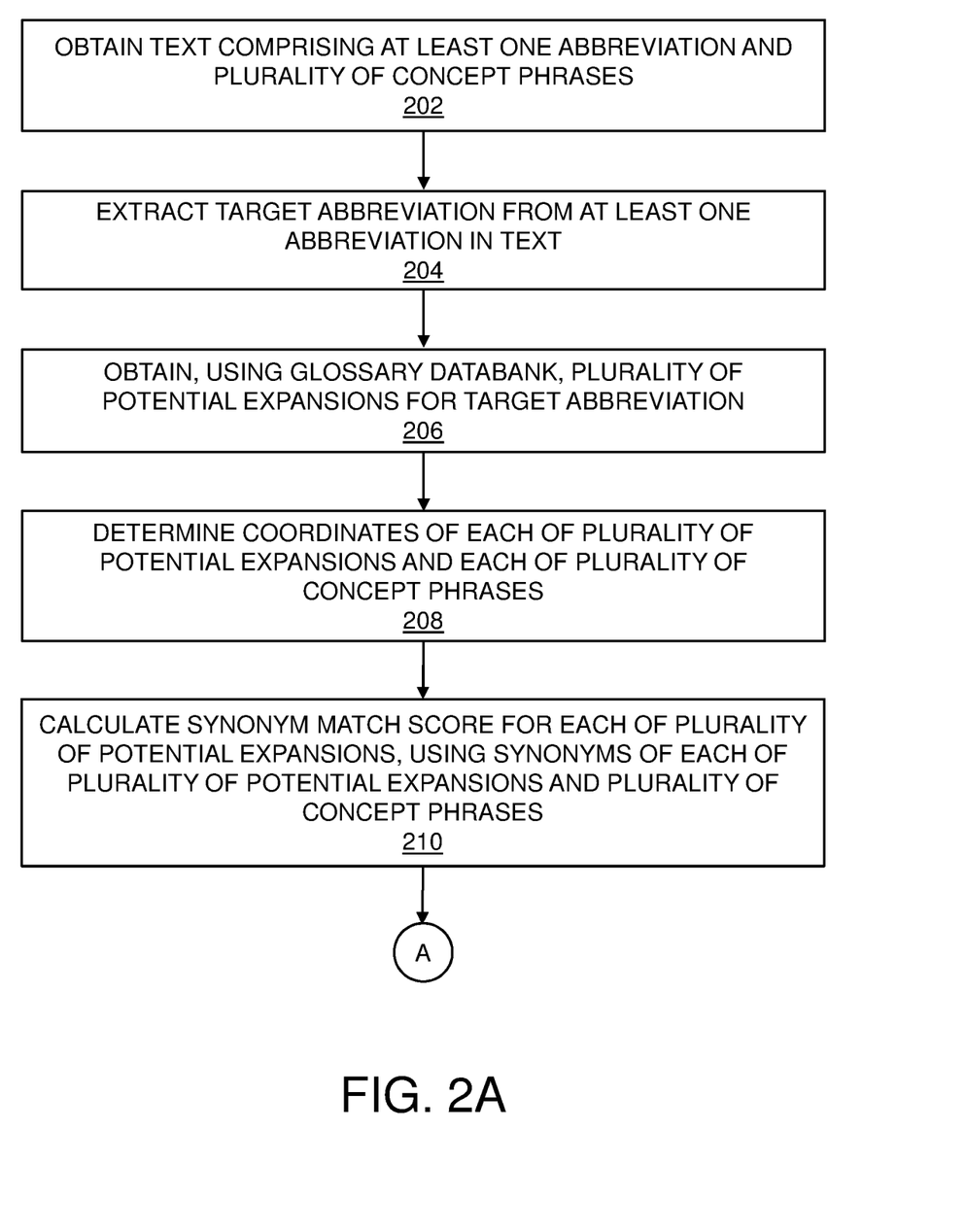
FIGS. 2A and 2B collectively are a flow chart depicting steps of a method for context-based abbreviation disambiguation, in accordance with an embodiment of the present disclosure.
Figure 2B:
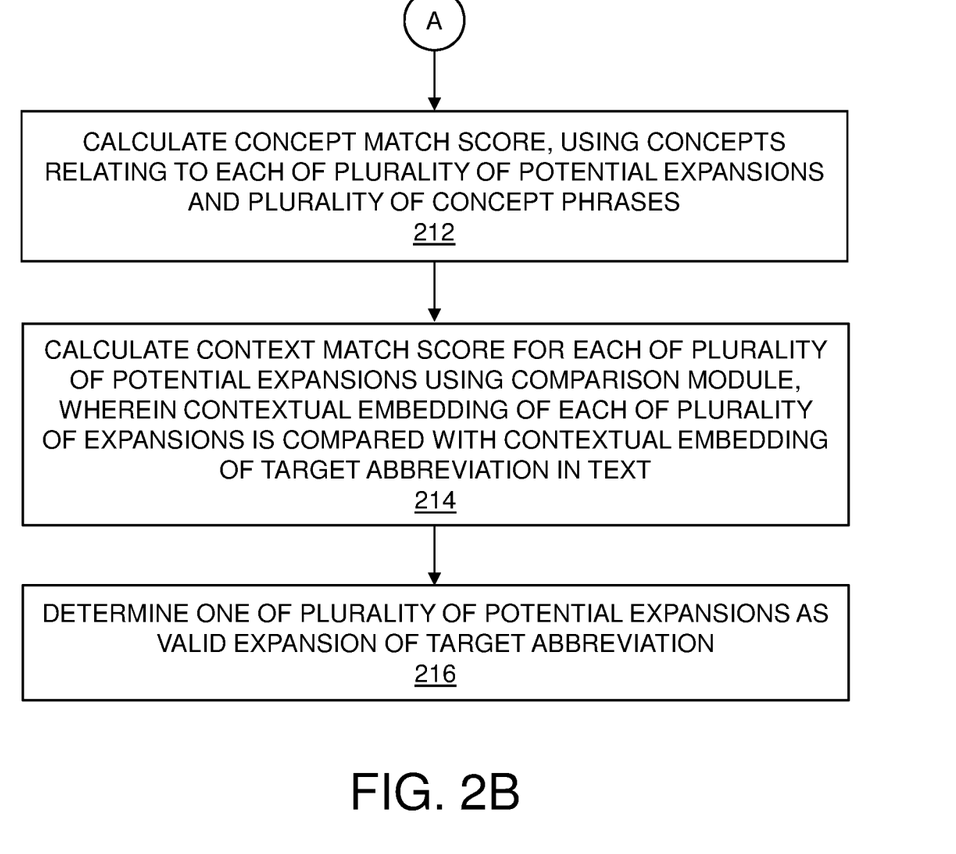

Referring to FIG. 2, illustrated is a flow chart depicting steps of a method of context-based abbreviation disambiguation, in accordance with an embodiment of the present disclosure. The method is depicted as a collection of steps in a logical flow diagram, which represents a sequence of steps that can be implemented in hardware, software, or a combination thereof, for example as aforementioned.

The method of context-based abbreviation disambiguation is implemented via a system comprising a server arrangement communicably coupled via one or more data communication networks with an ontological databank, a synonym databank, and a glossary databank.

At a step 202, a text comprising at least one abbreviation and a plurality of concept phrases is obtained.

At a step 204, a target abbreviation is extracted from the at least one abbreviation in the text.

At a step 206, a plurality of potential expansions for the target abbreviation is obtained, using the glossary databank.

At a step 208, coordinates of each of the plurality of potential expansions and each of the plurality of concept phrases is determined, in the multi-dimensional space using the ontological databank.

At a step 210, a synonym match score for each of the plurality of potential expansions is calculated, using synonyms of each of the plurality of potential expansions and the plurality of concept phrases, wherein the synonyms of each of the plurality of potential expansions are extracted from the synonym databank.

At a step 212, a concept match score is calculated using concepts relating to each of the plurality of potential expansions and the plurality of concept phrases, wherein concepts relating to each of the plurality of potential expansions are determined using the ontological databank.

At a step 214, a context match score for each of the plurality of potential expansions is calculated using a comparison module, wherein a contextual embedding of each of the plurality of expansions in the ontological databank is compared with a contextual embedding of the target abbreviation in the text.

At a step 216, one of the plurality of potential expansions is determined as a valid expansion of the target abbreviation based on at least one of the: synonym match score, concept match score and context match score.

The steps 202 to 216 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system for context-based abbreviation disambiguation, the system comprising:

an ontological databank represented into a multi-dimensional space, wherein the multidimensional space embeds one or more set of words comprised in the ontological databank such that meaning of each of the words, in the set of words, is derived from a characteristic of embedding of the word in the multi-dimensional space;

a synonym databank, wherein the synonym databank comprises semantic relations between a plurality of words used interchangeably;

a glossary databank, wherein the glossary databank comprises a list of words or phrases relating to a domain and a list of plurality of potential expansions for a plurality of abbreviations;

and a server arrangement communicably coupled to the ontological databank, the synonym databank and the glossary databank, wherein the server arrangement is configured to:

obtain a text comprising at least one abbreviation and a plurality of concept phrases, wherein the plurality of concept phrases contained in the text conveys a description relating to the domain associated with the text;

extract a target abbreviation from the at least one abbreviation in the text;

obtain, using the glossary databank, a plurality of potential expansions for the target abbreviation;

determine coordinates of synonyms of each of the plurality of potential expansions for the target abbreviation, each of the plurality of concept phrases and concepts relating to each of the plurality of potential expansions, in the multi-dimensional space using the ontological databank;

calculate a synonym match score for each of the plurality of potential expansions for the target abbreviation based on a proximity match of the coordinates of synonyms of a given potential expansion with the coordinates of the plurality of concept phrases in the multi-dimensional space, wherein the synonyms of each of the plurality of potential expansions for the target abbreviation are extracted from the synonym databank;

calculate a concept match score, upon obtaining synonym match scores, for each of the plurality of potential expansion for the target abbreviation, lying in a close range to the coordinates of the plurality of concept phrases, based on a proximity match of coordinates of concepts of the given potential expansion with the coordinates of the plurality of concept phrases in the multi-dimensional space, wherein concepts relating to each of the plurality of potential expansions for the target abbreviation are determined using the ontological databank; and calculate a context match score, upon obtaining concept match scores for each of the plurality of potential expansions for the target abbreviation, lying in a close range to the coordinates of the plurality of concept phrases, using a comparison module, wherein a contextual embedding of each of the plurality of potential expansions in the ontological databank is compared with a contextual embedding of the target abbreviation in the text; and determine one of the plurality of potential expansions for the target abbreviation as a valid expansion of the target abbreviation based on the calculated context match score, wherein the system employs machine learning algorithm to determine the valid expansion for the target abbreviation from the plurality of potential expansions.

2. The system of claim 1, wherein the comparison module employs machine learning algorithms.

3. The system of claim 2, wherein the machine learning algorithms comprise multi-scale recursive neural network language model.

4. The system of claim 1, wherein the server arrangement is configured to extract the target abbreviation from the text using a defined search pattern.

5. The system of claim 1, wherein the multi-dimensional space is a hyperbolic space.

6. A method of context-based abbreviation disambiguation, wherein the method is implemented via a system comprising a server arrangement communicably coupled to an ontological databank, wherein a multi-dimensional space embeds one or more set of words comprised in the ontological databank such that meaning of each of the words, in the set of words, is derived from a characteristic of embedding of the word in the multi-dimensional space, a synonym databank, wherein the synonym databank comprises semantic relations between a plurality of words used interchangeably, and a glossary databank, wherein the glossary databank comprises a list of words or phrases relating to a domain and a list of plurality of potential expansions for a plurality of abbreviations, the method comprising:

obtaining a text comprising at least one abbreviation and a plurality of concept phrases, wherein the plurality of concept phrases contained in the text conveys a description relating to the domain associated with the text;

extracting a target abbreviation from the at least one abbreviation in the text;

obtaining, using the glossary databank, a plurality of potential expansions for the target abbreviation;

determining coordinates of synonyms of each of the plurality of potential expansions for the target abbreviation, each of the plurality of concept phrases and concepts relating to each of the plurality of potential expansions, in a multi-dimensional space using the ontological databank;

calculating a synonym match score for each of the plurality of potential expansions for the target abbreviation based on a proximity match of the coordinates of synonyms of a given potential expansion with the coordinates of the plurality of concept phrases in the multi-dimensional space, wherein the synonyms of each of the plurality of potential expansions for the target abbreviation are extracted from the synonym databank;

calculating a concept match score, upon obtaining synonym match scores, for each of the plurality of potential expansion for the target abbreviation, lying in a close range to the coordinates of the plurality of concept phrases, based on a proximity match of coordinates of concepts of the given potential expansion with the coordinates of the plurality of concept phrases in the multi-dimensional space, wherein concepts relating to each of the plurality of potential expansions for the target abbreviation are determined using the ontological databank;

calculating a context match score, upon obtaining concept match scores for each of the plurality of potential expansions for the target abbreviation, lying in a close range to the coordinates of the plurality of concept phrases, using a comparison module, wherein a contextual embedding of each of the plurality of expansions in the ontological databank is compared with a contextual embedding of the target abbreviation in the text; and determining one of the plurality of potential expansions for the target abbreviation as a valid expansion of the target abbreviation based on the calculated context match score, wherein the system employs machine learning algorithm to determine the valid expansion for the target abbreviation from the plurality of potential expansions.

7. The method of claim 6, wherein the comparison module employs machine learning algorithms.

8. The method of claim 7, wherein the machine learning algorithms comprise multi-scale recursive neural network language model.

9. The method of claim 6, wherein the method comprises extracting the target abbreviation from the text using a defined search pattern.

10. The method of claim 6, wherein the multi-dimensional space is a hyperbolic space.

\* \* \* \* \*